United States Patent

[11] 3,525,291

| [72] | Inventors | Yoshio Hakamata |
| --- | --- | --- |
| | | Tokyo, Japan; |
| | | Kiyoji Nakamura, Tokyo, Japan |
| [21] | Appl. No. | 673,748 |
| [22] | Filed | Oct. 9, 1967 |
| [45] | Patented | Aug. 25, 1970 |
| [73] | Assignee | Fugi Shashin Film Kabushiki Kaisha |
| | | Kanagowa, Japan |

[54] HIGH RESOLVING POWER PHOTOGRAPHIC CAMERA
3 Claims, 5 Drawing Figs.

[52] U.S. Cl. .................................................. 95/11,
95/37, 95/61, 352/208, 352/225
[51] Int. Cl. ............................................. G03b 17/00,
G03b 17/42
[50] Field of Search ........................................ 95/11, 58,
59, 61, 37; 352/204, 208, 225; 355/(Inquired)

[56] References Cited
UNITED STATES PATENTS
| 1,991,578 | 2/1935 | Rixen .......................... | 95/37UX |
| 2,573,278 | 10/1951 | Rowe et al. .................. | 95/37 |
| 2,763,182 | 9/1956 | Urban et al. .................. | 95/37X |
| 2,787,942 | 4/1957 | Edwards ...................... | 95/37 |

FOREIGN PATENTS
| 860,247 | 9/1939 | France ....................... | 352/225 |

Primary Examiner— Norton Ansher
Assistant Examiner— Robert P. Greiner
Attorney—Sughrue, Rothwell, Mion, Zinn and MacPeak ABSTRACT: A photographic camera having picture frame fixed to a lens barrel which is movable in a direction parallel to the optical axis of the lens. The camera has a rotary disc shutter, with a cam mounted thereon, for rotation about an axis parallel to the optical axis. A cam follower is provided on the lens barrel to engage the cam on the rotary disc shutter. During exposure, when the shutter opening and the optical axis coincide, the cam on the rotary disc shutter moves the cam follower and the picture frame on the lens barrel is pressed into contact with the film to produce pictures of high resolution.

Patented Aug. 25, 1970 3,525,291
FIG. 1
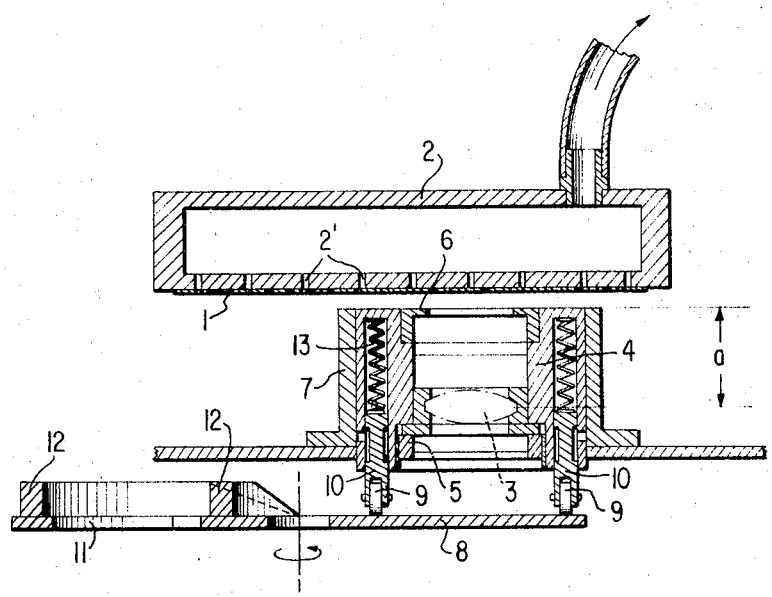
FIG. 4
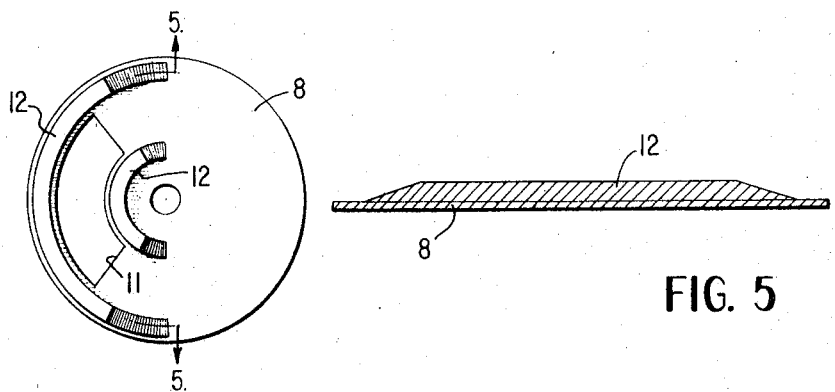
FIG. 5
INVENTORS.
YOSHIO HAKAMATA
KIYOJI NAKAMURA
BY Sughrue, Rothwell, Mion, Zinn & Macpeak
ATTORNEYS.

INVENTORS
YOSHIO HAKAMATA
KIYOJI NAKAMURA

HIGH RESOLVING POWER PHOTOGRAPHIC CAMERA

BACKGROUND OF THE DISCLOSURE

It is a problem to achieve photographic pictures having high resolving power not only in microphotography which especially requires high resolving power, but also other forms of photography. In order to obtain a photographic picture having high resolution, various kinds of photographic techniques have been employed involving the use of excellent film, lenses, processing solutions, etc., in order to improve the conditions under which the photographs are produced.

SUMMARY OF THE INVENTION

The present invention relates to a photographic camera having high resolving power and in particular, to an improved photographic camera in which the high resolving power allows it to be used in the taking of microphotographic prints. In the present invention, the camera lens system is fixed to the picture frame which is pressed in contact with the planar film with the lens system and picture frame being movable in a direction parallel to the optical axis to allow adjustment of the film relative to the picture frame for making multiple exposures at spaced positions on the same planar film. However, for each exposure and picture taken, the picture frame is repressed in contact with the surface of the film so that the relationship between the plane of the film and the focal point of the camera lens system remains constant and whereby the camera, in accordance with the present invention, has a high resolving power.

BRIEF DESCRIPTION OF THE DRAWINGS

FIG. 1 is a sectional elevational view of the main components of the camera in accordance with the present invention prior to exposure.

FIG. 4 is a rotary shutter forming a portion of the camera illustrated in FIGS. 1 and 2.

FIG. 5 is a sectional view taken about lines 5-5 in FIG. 4.

DESCRIPTION OF THE PREFERRED EMBODIMENT

Figure 2:
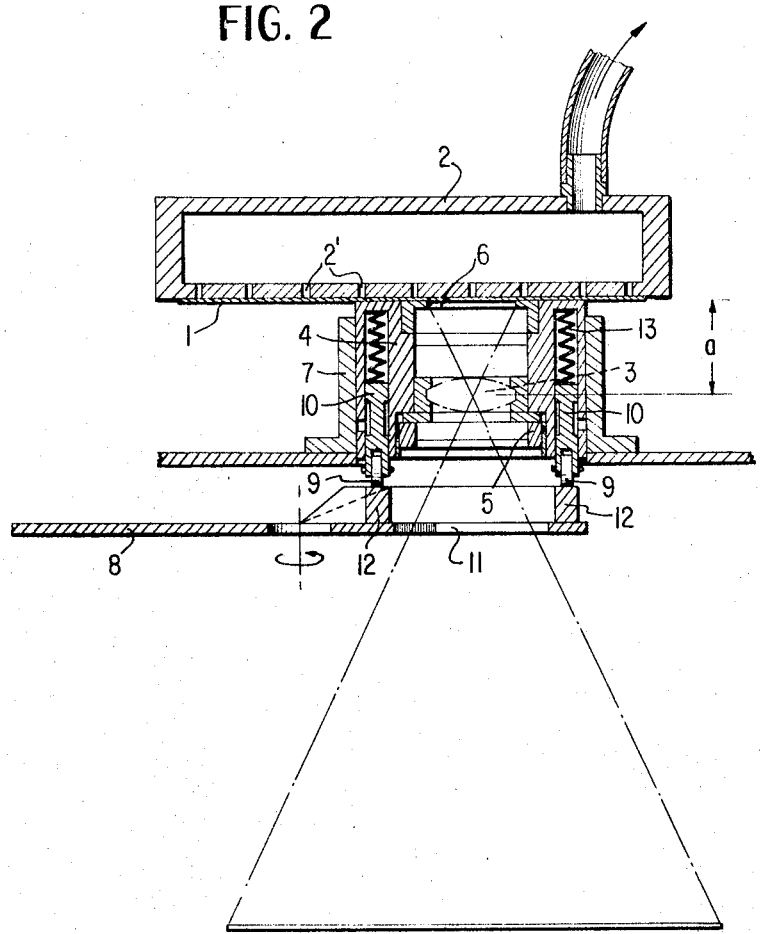
FIG. 2 is a sectional elevational view of the same main portions of the camera in accordance with the present invention during exposure of the film.

In FIG. 1, the film 1 is held by suction onto the bottom surface of a suction plate 2 which is connected to a vacuum pump (not shown) by means of the nozzle and hose. While FIG. 1 shows the film in sheet form, the present invention has application to the case in which roll film is provided in which both ends thereof are wound on spools and wherein the intermediate portion of the film is tensioned to make the film area for exposure lie in a single plane. Also, in cases where the film is carried by a special cartridge, a suction plate or the like must be used in order to keep the film within the desired frame relative to the lens system of the camera. The lower surface of the suction plate 2 is planar and is provided with a number of small suction holes 2' whereby the film 1 occupies a planar position when vacuum pressure is applied to the suction plate 2.

A lens 3 is shown fixed to a lens barrel 4 by use of a nut 5 and a picture frame 6 is mounted to the opposite end of the lens barrel 4 or may be integrally formed with the barrel. The lens barrel 4 is held in a lens barrel guide 7 so that the lens barrel 4 is movable in a vertical direction along the lens barrel guide 7 and moving simultaneously the lens 3 and the mask 6.

Figure 3:
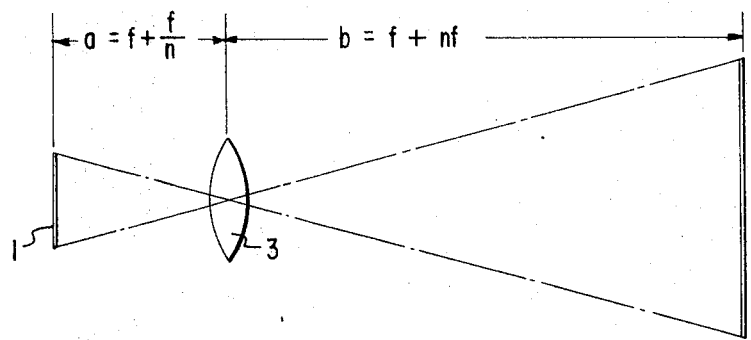
FIG. 3 is a diagrammatic view of the camera lens system.

The lens 3 is, of course, set so that the optical axis thereof is perpendicular to the surface of the film 1, both in the X and Y directions and that the distance $a$ between the principal point of the lens and the film remains exactly the same, regardless of the number of times the barrel is moved into contact with the film carried by the support 2 (see FIG. 3).

For carrying out the above operation and satisfying the above-defined photographic conditions, the lens barrel 4, the picture frame 6 and the lens 3 are all unitary and thus move together. That is, during photographing, the lens barrel 4 is moved along the lens barrel guide 7 in a vertical direction simultaneously carrying lens 3 and picture frame 6, with the picture frame 6 being pressed onto the surface of the film 1. Therefore, if the lens barrel is accurately made, and the lens is accurately positioned perpendicular to the film, then the distance between the optical center of the lens 3 and the film 1 corresponds accurately to the dimension $a$ (FIG. 3). Since the lens barrel 4 is a single part of the camera, it is easy to accurately make it both in regard to dimension and shape. Moreover, since it is only required that the lens barrel 4 be highly accurate, the other parts may be easily made without the requirement for accuracy and the lens barrel may be changeable therewith.

In order to take a number of pictures on the same film, the suction plate 2 is moved in a direction perpendicular to the optical axis of the lens system, and a series of images are photographed on the film, in a row. Therefore, in the case of a roll film, of microfilm, which may be used in the camera, the pictures are exposed on the microfilm in a row.

The suction plate 2 is not connected to the lens barrel 4 and since the lens barrel 4 is moved many times relative to the suction plate, it is difficult to accurately hold the suction plate perpendicular to the axis of the lens system and to maintain the distance $a$ from the principal point of the lens system to the film constant. It is, therefore, particularly advantageous that only the lens barrel of the present camera be required to be made highly accurate, both in dimension and configuration. The advantages of the present invention become readily apparent. The exposed portion of the film which is maintained in planar position, is exposed sharply for the film 1 is pressed by the contact surface of the picture frame which is integral with the lens barrel 4.

It is preferred that a rotary shutter be used to achieve exposure and simultaneously movement of the lens barrel axially so that the picture frame 6 may be pressed onto the film 1. The rotary shutter comprises a disk 8 which is provided with an opening 11 allowing exposure, the disk being rotated about its axis. When the opening 11 is aligned to the optical axis of the lens system, the light passes through the shutter opening. On the disk 8, there is provided a cam 12 which is coaxially positioned. The cam 12 acts in conjunction with the lens barrel to press the picture frame 6 onto the film 1 during film exposure as shown in FIG. 2. A roller 9 follows the cam 12 with the roller being carried by a pushing lever 10 which transmits the displacement produced by the cam to the lens barrel 4 moving the same upwardly and into contact with the film 1, pressing the picture frame thereagainst. Any vibration and excess displacement produced by cam 12 are absorbed by means of the spring 13. Thus, by making the picture frame and the lens fixed to the lens barrel as a unit and by accurately maintaining a set distance between the lens and the film and by having the film pressed to its supporting frame in planar fashion by the picture frame, the camera provides high resolving power.

The invention has been described in detail with particular reference to a preferred embodiment thereof, but it will be understood that variations and modifications may be effected within the spirit and scope of the invention as described hereinabove and as defined in the appended claims.

We claim:

1. A photographic camera having high resolving power, said camera comprising: means for supporting a photographic film at a fixed planar position, a lens barrel carrying a lens system, a picture frame fixed to the barrel at one end thereof, means for mounting said lens barrel for limited movement along said optical axis relative to the film carried in said fixed planar position and for contact therewith whereby, with said picture frame moved out of contact with said film, said film may be moved at right angles to said optical axis, a rotary shutter disc mounted for rotation about an axis parallel to the optical axis and on the side of said lens barrel opposite said film, a shutter opening carried by said disc for movement into coaxial position with said optical axis, cam members carried by said disc at radially spaced positions on each side of said shutter opening, and cam follower means carried by said barrel on opposite sides thereof for engagement with respective cam member whereby, said barrel is pressed against said film by said radially spaced cam member when said optical axis and said shutter opening axis coincide.

2. The photographic camera as claimed in claim 1 wherein said radially spaced cam members comprise curved segmental rails and said cam followers comprise rollers carried by said barrel for rolling contact with said rails.

3. The camera as claimed in claim 2 wherein said barrel assembly includes axial recesses on either side of said optical axis and parallel thereto, said rollers are carried on movable levers positional within said recesses and said camera further includes a spring member positioned within each of said recesses and acting on the inner end of a lever to resist movement toward the film when said rollers contact said spaced cam members whereby, the springs tend to act as resilient buffers during cam pressing of the barrel against the relatively stationary planar film.